UNITED STATES PATENT OFFICE.

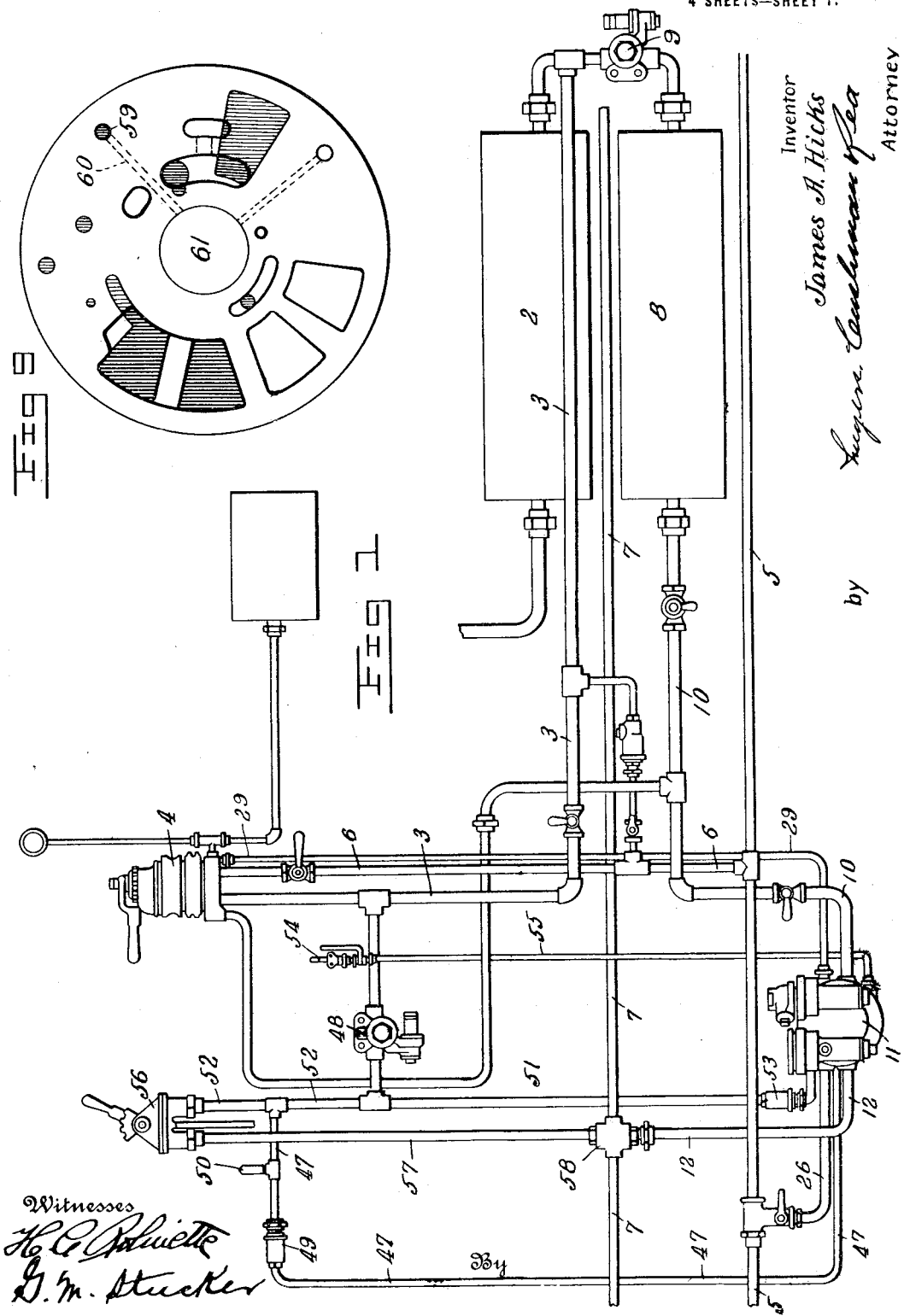

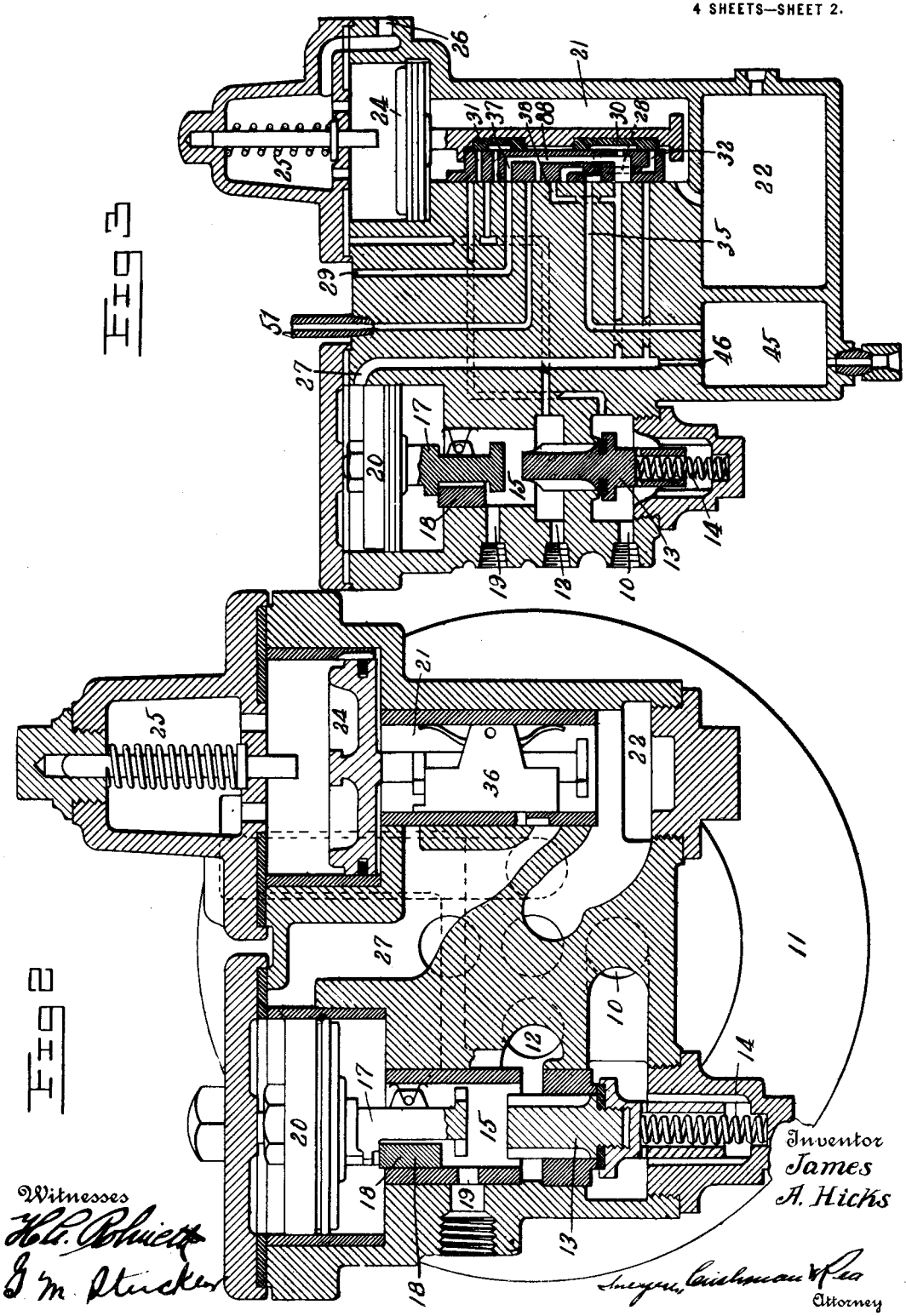

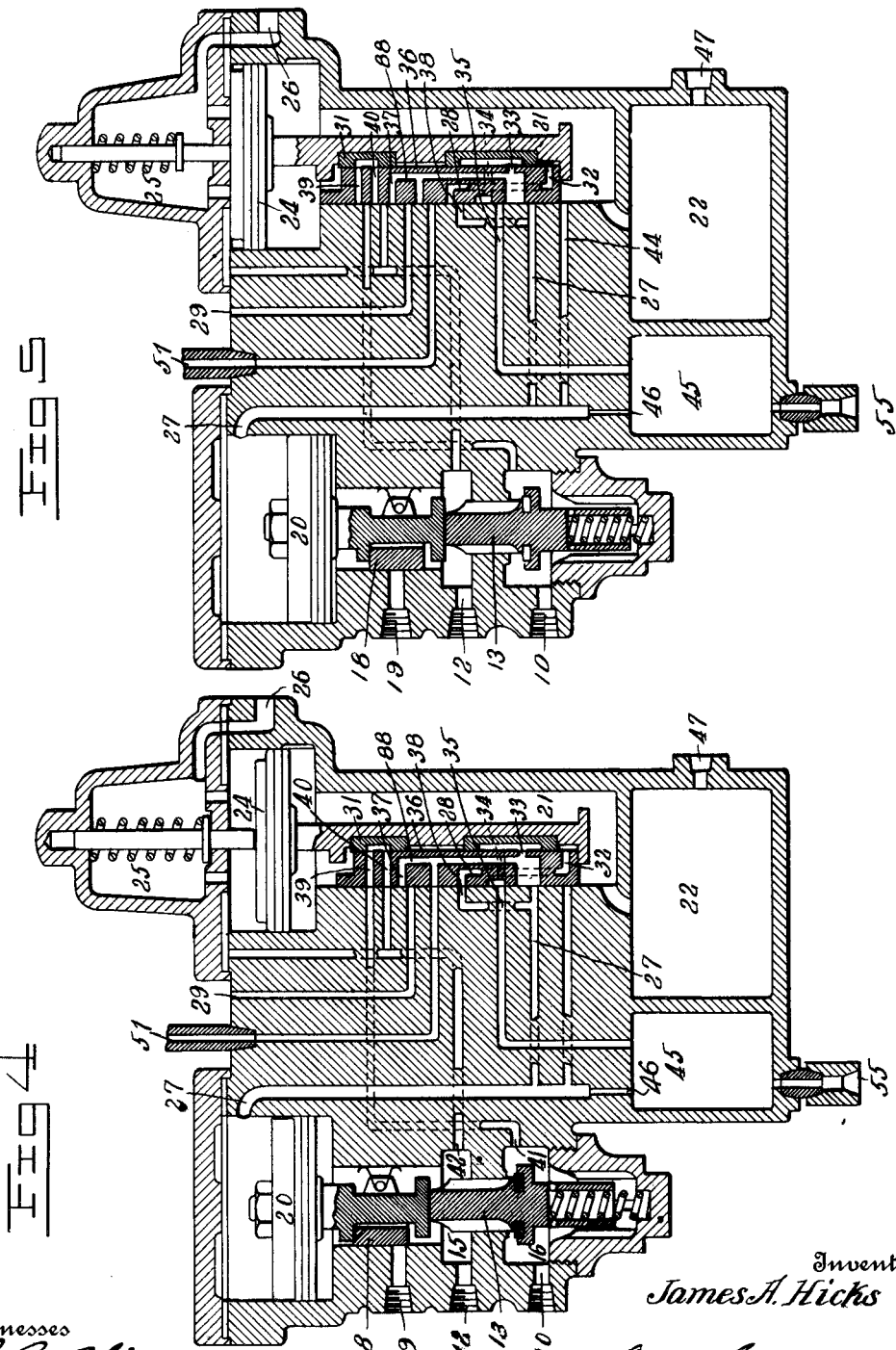

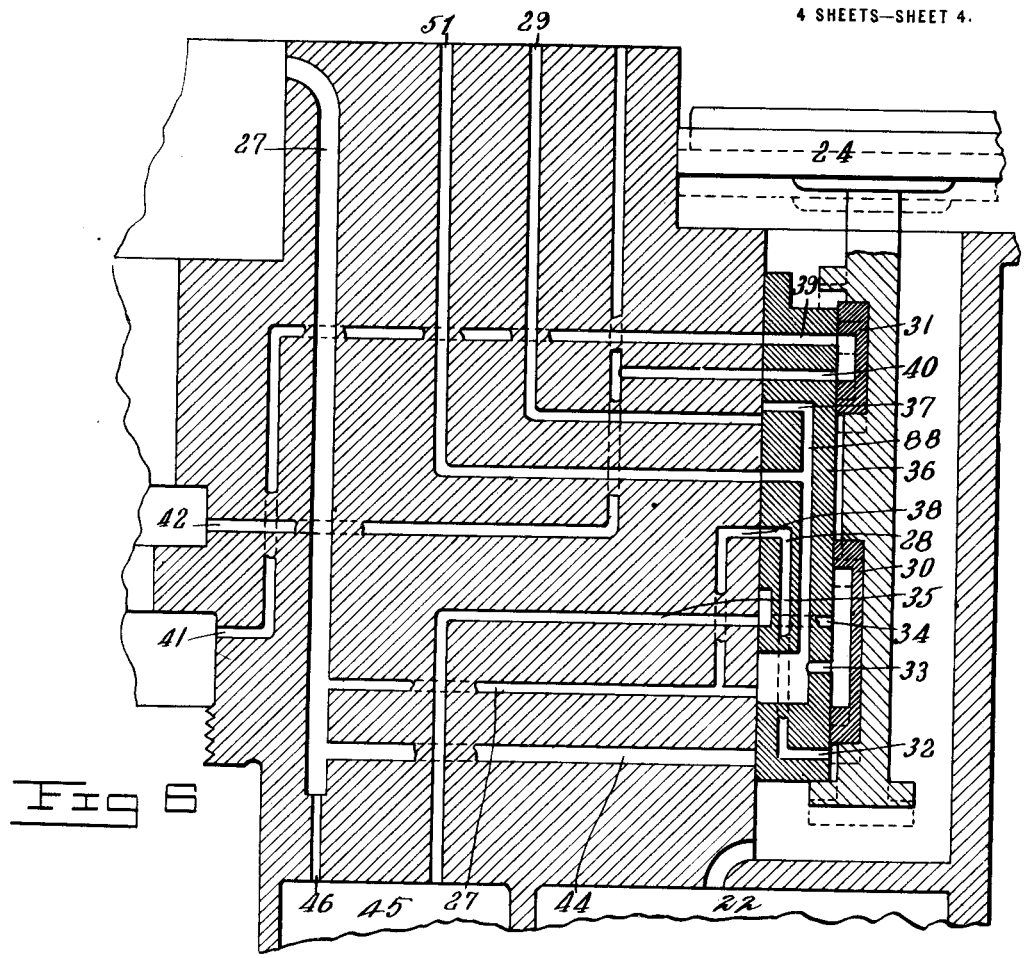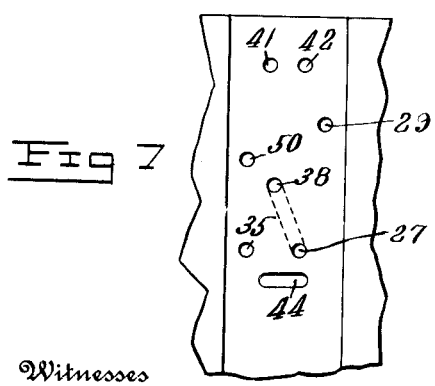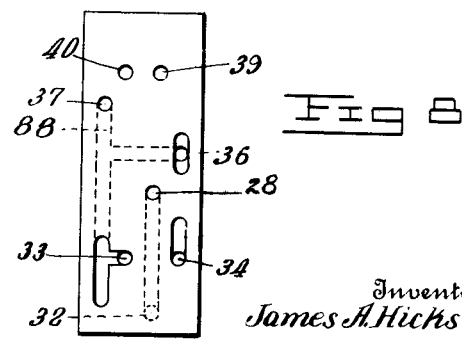

JAMES A. HICKS, OF ATLANTA, GEORGIA.

FLUID-PRESSURE BRAKE SYSTEM.

1,179,432.   Specification of Letters Patent.   Patented Apr. 18, 1916.

Application filed April 5, 1911.   Serial No. 619,186.

*To all whom it may concern:*

Be it known that I, JAMES A. HICKS, a citizen of the United States, residing at Atlanta, in the county of Fulton and State of Georgia, have invented new and useful Improvements in Fluid-Pressure Brake Systems, of which the following is a specification.

The present invention relates to fluid pressure brake systems, and has particularly to do with an automatic control device for handling air direct from a supply and putting it into the brake cylinders, the control device being automatic in its action and being responsive to reduction of pressure in trainline when automatic application of brakes is made by the engineer's rotary valve, provision being made also, whereby after an application of brakes through the operation of the control device an independent release may be made. Furthermore, provision is made in this system for an independent manual control of straight air. The control device, as illustrated in the present disclosure, is shown as coöperating with engine and tank brakes, in which relation it is particularly useful, although it will be understood that the device is capable of use wherever an automatic and graduated control of air for the brake cylinders is desirable.

In order that the device may be clear to those skilled in the art, I have shown one embodiment of the invention in the accompanying drawings.

In said drawings, Figure 1 is a view, somewhat diagrammatic, of so much of a fluid-pressure brake system as is necessary to an understanding of my invention. Fig. 2 is a sectional view of the control device, the parts being shown in "running" position. Fig. 3 is a diagrammatic view of the device shown in Fig. 2, to show the ports and passages, this view being distorted and no attempt being made to illustrate the mechanical structure, the valve in this view being shown in "running" position. Fig. 4 is a diagrammatic view showing the parts in "service" position. Fig. 5 is a diagram showing the parts in "emergency" position. Fig. 6 is a diagram, enlarged, to show the ports and passages, of so much of the piston stem, slide valve, and graduating valves, as is necessary for a clear understanding of the invention, the device being shown in full lines in "service" position and in dotted lines in "lap" position. Fig. 7 is a plan view of the slide valve seat. Fig. 8 is a plan view of the face of the slide valve. Fig. 9 is a diagrammatic view of the seat and valve of an engineer's valve.

Referring now to the drawings (Fig. 1) 2 indicates a main reservoir supplied by a suitable compressor (not shown); 3 is the main reservoir feed to the engineer's rotary valve 4; 5 is the train pipe; and 6 the train pipe feed; the rotary valve being provided with the usual gage and equalizing drum as shown. The engine and tender brake cylinders have the connection 7, the supply of air for pipe 7 and the brake cylinders coming from maintaining reservoir 8 which connects through a suitable feed valve 9 with the main reservoir 2, the air supply from reservoir 8, passing by pipe 10 to the automatic control device 11, by means of which it is controlled and graduated, and by connection 12, to the brake cylinder pipe 7 and the engine and tender brake cylinders.

The control device 11, which handles the air from the supply 8 for the engine and tender brakes will now be described in detail, reference being had particularly to Figs. 2 to 5, inclusive, and the detail view of the slide valve and slide valve seat, Figs. 7 and 8. The control device 11 is similar in some respects to the control device heretofore invented by me and used in the Hicks system of braking, but certain changes and improvements have been made which simplify and render more efficient the present control device.

Referring now to Fig. 2, it will be seen that the device comprises two chambers which may be referred to conveniently as the triple-valve chamber, at the right in Fig. 2, and the control-valve chamber at the left in Fig. 2. On the control valve side, which will first be described, there is provided a control valve 13 which seats against the under side of a suitable valve seat in the casing, is upheld by a spring 14, and closes under pressure from the lead 10, which delivers from the supply 8 below the valve 13, which valve is normally in the position shown in Fig. 2. Above the valve 13 is a chamber 15, which, by a suitable port delivers air to the connection 12 which leads to the brake cylinder pipe 7 for the engine and tank. The chamber 15 above the valve 13 receives the stem of an exhaust slide valve piston, which stem extends downwardly into close proximity to the tail of the valve 13, and said piston stem 17 is provided with a slide valve 18 controlling an exhaust port 19, the piston 20 playing in a chamber which is sealed by a suitable cap plate or in any other convenient manner. With this construction, it will be obvious that if the piston 20 be depressed by excess or predominating pressure on its upper side, it will move downwardly, its stem 17 will open the valve 13 and permit the pressure from connection 10 to pass the valve 13 into the connection 12, the slide valve 18 closing the port 19 which leads to exhaust. The movement of the piston 20 determines, of course, the movement of the valve 13 and the air pressure which goes from the supply 8 by connection 10, through the control device 11, by connection 12, and brake cylinder pipe 7 to the brake cylinders. The graduation of this pressure given up by the control valve 13 is dependent on the operation of the devices in the triple valve chamber which will now be described.

The triple valve chamber 21 is connected with the auxiliary reservoir 22, and is provided with a slide valve and graduating valve, which will presently be described in detail, carried by the stem of a piston 24 mounted in a suitable piston chamber, which chamber is fed from cap 25 through a connection 26 with the train pipe 5. The slide valve seat, which will be described in detail hereinafter, connects by a suitable passage 27 with the chamber above the piston 20 on the control valve side.

With the parts in the position shown in Figs. 2 and 3, which is "running" position, train-pipe pressure coming from train-line 5 by connection 26 feeds into the cap 25, past the groove around piston 24, into the triple valve chamber 21 to the auxiliary reservoir 22, so that in "running" position a pressure equal to the pressure of supply 8, which is determined by the feed valve 9, is maintained on the triple side of the control device; the triple side in the meantime being cut off from the control side by the slide valve, so that piston 20 will remain in the position shown in Fig. 2 with its stem 17 out of contact with the tail of the valve 13 and the exhaust port 19 open; the chamber above the piston 20 being exhausted by a passage 27, which delivers to a ported passage 28 (see diagram Fig. 3) in the slide valve, leading to exhaust passage 29, so that in this position the control device stands with the pressure of the supply 8 on the triple valve side, and the pressure off the piston 20 on the control valve side, with the control valve closed.

When the pressure in train pipe 5 is reduced by movement of the engineer's valve 4 for example, to "service" position, the air being taken out of the train pipe 5 through the connection 6 with the engineer's valve, it will be apparent that the pressure above piston 24 on the triple valve side of the control device will be reduced in proportion to reduction of train pipe pressure, and the piston 24 being then under unbalanced pressure will rise, drawing the graduating valves 30 and 31. The graduating valve 30 will accomplish two results. First, it will uncover the service port 32 which leads by a suitable passage to the face of the slide as shown, this port opening on the face of the slide being normally blanked on the slide valve seat, so that, though the port 32 is uncovered when the graduating valve 30 is drawn and is opened to the pressure in the triple valve chamber 21 and the auxiliary reservoir 22, yet no action results, because the outlet from the slide valve passage is closed. Second, the graduating valve 30, when it is drawn, bridges the ports 33, and 34, the port 33 opening to the passage 28 in the slide which connects at its lower end with the passage 27 in the slide seat, while the port 34, (see dotted lines Fig. 3), though normally blanked is designed to catch the passage 35 which enters the slide-valve seat.

As stated, drawing of the graduating valve 30 accomplishes two results and immediately the slide valve 36 is drawn the action of the piston stem tail engaging the lower end of the valve, the port 28 at the face of the valve and which connects by the longitudinal passage with the service port 32 will catch the port 38 in the slide valve seat, and, by a suitable passage, deliver pressure from chamber 21, by way of port 32, slide valve passage 28, slide valve seat port 38, and connecting passage with passage 27 leading to the chamber above piston 20, so as to supply to said piston the pressure which is in chamber 21, graduated, of course, according to the extent of movement of the piston, slide valve, and the graduating valve. The passage 88 which normally connects the control valve passage 27 and exhaust passage 29 will be lapped at its upper end with respect to passage 29, as shown in Fig. 4, so that in service position of the slide valve the exhaust from the control valve piston chamber will be closed.

The graduating valve 31, during the initial movement of the piston has moved to the position shown in Fig. 4, so that its groove bridges the ports 39 and 40, these ports, as shown in Fig. 3, being out of communication with the passages in the slide valve seat when the valve is in release position with the graduating valve blanking the port 40. This movement of the graduating valve 31 so that it bridges the ports 39 and 40, is effective immediately the slide valve 36 is moved to bring the ports 39 and 40 into communication respectively with passages 41 and 42 to the slide valve seat, the passage 41 leading from chamber 16 below the control valve 13, which chamber 16 communicates by a suitable passage 10 with the supply 8. The passage 42 goes into the passage leading from beneath the triple-valve cap, which passage in a certain other system invented by me coöperated with a quick-action head not necessary to be described or shown in this connection, this being merely a feature which makes for convenient interchange of the control device with other systems of my invention, and said passage 42 leads to the chamber 15 above control-valve 13.

The port 39, when the slide is drawn, as just stated, registers with passage 41 leading from the slide valve seat to the chamber 16 below the control valve 13, which chamber, as hereinbefore stated, communicates by passage 10 with the supply 8, this arrangement forming a by-pass to valve 13.

From the foregoing it will be seen that when the graduating valves and the slide valve are drawn in making a "service" application, that, through the arrangement of ports and passages just set forth, pressure from chamber 21 and auxiliary reservoir 22 is admitted to the piston 20, which is depressed, and the control valve 13, being operated by the stem 17 of the piston 20, is opened, the extent of opening of this valve 13 being determined by the movement of the slide valve and its operating piston, on the triple valve side of the control device. Simultaneously the pressure chamber 16 below the control valve 13 is put into communication through the passage 42, ports 40 and 39, bridging groove of the graduating valve 31, and passage 41, with the chamber 15 above the control valve 13, leading to brake cylinder passage 12, this resulting in balancing or at least tending to balance pressures on opposite sides of the control valve 13, so that as the piston 20 descends under pressure from the auxiliary reservoir 22, the valve 13 will be easi'y  t  seated and full pressure, or pressure graduated in accordance with the movement of the triple valve device, will pass from supply 8, by connection 10, control valve 13, and connection 12, to the brake cylinder pipe 7, and thence to the brake cylinders, the exhaust port 19 having of course been closed by the valve 18 when the piston 20 descends. This arrangement gives a more evenly balanced valve on the control side; it simplifies the valve arrangements and operations materially; and it balances more nearly the piston 20 so that movement of the valve 13 is rendered easier, movement of the piston 20 is smoother; and hammering of the piston stem upon the valve tail is avoided.

The position shown in Fig. 4, which is "service" position, will of course be maintained during service application, and the piston of the triple may drop back to lap. (see dotted lines, Fig. 6) if desired, the slide valve remaining in the service position. The position of light service, when the ports will just catch each other and a graduated pressure be put on top of piston 20 with a resulting light pressure in the brake cylinders, is not illustrated in detail, as variations between light service and full service will be obvious.

In Fig. 5, I have shown the parts at "emergency" position, where it will be seen that all of the ports save emergency passage 44 are blanked, the passage 44 being opened by the tail of slide valve 36 being drawn clear of it so as to permit full auxiliary reservoir pressure to pass by way of passage 44 and passage 27 to the top of the piston 20, giving a sudden and strong movement to the piston 20 and its parts, resulting in the emergency opening of the control valve 13. In this "emergency" position it is desirable not only that the piston 20 and control valve 13 be actuated with certainty and to their full capacity on the initial movement, but also that the control valve close slowly as the brake cylinder pressure builds up, and this is accomplished by restricting the expansion from above the piston 20, which is connected through the restricted passage 46 at the lower end of the passage 27 with an expansion chamber or control reservoir 45, as shown in the diagram, Fig. 5. It will be seen that with this restricted passage 46 at the lower end of the passage 27, pressure from the auxiliary reservoir will, in emergency position of the valve, go by passage 44 and passage 27 to the piston chamber and exert its full initial pressure on the piston 20, opening the control valve 13 and closing the exhaust valve 19, thus giving full and a higher emergency pressure in the brake cylinder feed passage 12 than would be the case if the passage 27 were not restricted at the point 46 where it enters the expansion chamber 45. The pressure in the auxiliary pressure chamber and from above the piston 20 will then expand slowly through the restricted passage 46 into the control reservoir 45 until pressure in the auxiliary pressure chamber, in the piston chamber, and the control chamber 45 are equalized, thus retarding or delaying the closing of the control valve 13 and opening of the exhaust valve 19. Under this condition of slow equalization of the pressures due to the restricted expansion through passage 46, the piston 20 will, under the increased brake cylinder pressure, gradually open the exhaust 19 and release the pressure from the brake cylinders, relieving the cylinders proportionately as it lifts to its normal position, and permit the control valve 13 to close.

The result of providing the control chamber 45 and connecting it by the restricted passage 46 with the piston chamber is, that I am able to increase momentarily the brake cylinder pressure and then use the gradual equalizing of pressures in the auxiliary chamber 22, and above the piston 20, and in the control chamber 45 through the restricted passage 46, to gradually relieve the brake cylinders in "emergency" and the necessity of doing this through the slide valve and the blow down passage is done away with. This has the advantage that every distributer will automatically build up brake cylinder pressure in "emergency," and in double heading, for example, the distributers on all of the engines will automatically build up and relieve the brake cylinder pressure and give an automatic control of all engines not hitherto accomplished by distributers of this type.

The control device 11 is provided with a feed connection 47 running from the low pressure side of the reducing valve 48 (see Fig. 1), a non-return check valve 49 being provided in the connection 47, so that, while the pressure is free to pass from the low-pressure side of the reducing valve 48 by way of pipe 47 to the control device 11 it is blocked against return. Furthermore, the connection 47 is provided with a blow-down 50 which is conventionally shown in Fig. 1, and which, as will be seen, is so located in the connection 47 that the non-return check valve 49 lies between the blow-down 50 and the control device. With this arrangement it will be seen that a feed from reservoir 2, pipe 3, pressure reducing valve 48, by pipe 47, to the auxiliary reservoir 22 of the control device 11 is provided, and since the blow-down 50 will be set at a pressure above the normal pressure passing the reducing valve 48, it will be inactive except under such conditions as increase the pressure above normal. Such condition of increased pressure would occur, where, after a service application, the pressure in control chamber 45 and above the piston 20 passes by passages 27 and 35, to the slide valve passage 88, blow down port and connection 51 to the blow down 50, and this position of the ports and passages, which is shown in diagram in Figs. 4 and 6 connects with the blow-down passage 51, which, as shown in the piping system, Fig. 1, couples in to the connection 52 on the low pressure side of the reducing valve 48. This pressure in the control device 11 resulting from a service application, will, by this arrangement, blow down through pipe 51, pipe 52, connection 47, and blow down 50, until the pressure at which the blow-down is set is reached, say, for example, down to forty pounds, the non-return check 53 in the pipe 51, preventing pressure from feeding into the control device 11 so that derangement of the control device 11 by reason of pressure from pipe 3 through reducing valve 48 and pipe 51 is effectually guarded against. At the same time since the reducing valve 48 is putting forty pounds pressure always into the connection 51, 52, and 47, any derangement of the blow-down 50 tending to blow the pressure from the control device 11 down to a lower point than is desirable will be counteracted by the forty pounds, or such other pressure as may be determined upon which is being constantly put into the control-device side of the system through the reducing valve 48 from the main reservoir 2, and all danger of the system being robbed of air completely by reason of a deranged blow-down is avoided.

In order that, after the engine and tender brakes have been applied through the automatic action of the control device 11 hereinbefore described they may be released without releasing the train brakes, I provide an independent release device which may be any suitable type of release valve 54, within convenient reach of the engineer and connecting by pipe 55 with control chamber 45, so that when the valve 54 is open the pressure from control chamber 45 will be released and the pressure from the top of the piston 20 will be released by way of passage 27 which leads to the slide valve, and thence, as shown in the service position in Fig. 4, passes under the graduating valve 30, across the slide valve 36, into passage 34, and thence to the control chamber 45 and release pipe 55 to the release valve 54. Furthermore, the restricted portion 46 of the passage 27 will also bleed the pressure in the system away through the control chamber 45, and by way of pipe 55, and valve 54, until the pressure has been reduced in the control device 11 to the point where the control valve 13, the piston 20, and the exhaust slide 18 will move over by superior pressure on the under side of the piston 20.

I have shown in the system herein illustrated an independent straight air valve device 56, which is coupled to the feed pipe 52, and by means of pipe 57 leads directly to a double throw check valve 58, of any suitable type, in the pipe 7 leading to the engine and tender brake cylinders. The valve 56 will be provided with release, application, and lap positions, so that the air from 52 which comes past the reducing valve 48 direct from main reservoir 2, may be thrown through the valve 56 by way of pipe 57 to the engine and tender brakes by way of pipe 7, the double check valve 58, serving to block this straight air when the valve 56 is in use, from passing by way of pipe 12 to the control device 11.

From the foregoing it will be seen that the valve 56 may be used independently of the rest of the system to handle straight air from the reservoir 2 by way of reducing valve 48, and put it into the brake cylinders of the engine and tender, and this is of considerable value particularly in handling a switch engine, and also when the engineer wishes to simply apply his engine and tender brakes without operating his automatic train braking system. In other words, this is simply a straight air brake independent of the automatic control of straight air which has heretofore been described.

Reference has heretofore been made to the reduction of train pipe pressure by the engineer's valve 4, and said engineer's valve 4 may be of any suitable type, either slide or rotary, although the usual rotary type is here shown, it being essential only that an engineer's valve capable of controlling train line pressure in the usual way be provided, said valve having as usual the feed ports, service ports, exhaust ports, etc., for handling the feed and reduction of train line pressure. Since the control device 11 responds automatically to variations in train line pressure in the train pipe 5, I only provide, so far as the present system is concerned, an additional exhaust port 59 in the seat which couples to the triple exhaust connection 29 in "running" position, the valve proper having a passage 60 which connects with the port 59 in the seat in running position, said passage 60 delivering to the central exhaust cavity 61 or any other suitable exhaust passage.

While I have shown a particular embodiment of my device it will be understood that considerable latitude may be indulged in in building fluid pressure brake apparatus in accordance with my invention, and I do not therefore confine myself to the exact details shown but claim all equivalents for the instrumentalities set forth in this illustrative disclosure.

I claim:—

1. In a fluid-pressure brake-system and in combination, a supply of air, a brake-cylinder connection to said supply, a brake cylinder-pressure control-valve in said connection, a by-pass from the supply-side of said valve to the brake-cylinder side, and means for controlling said by-pass; said by-pass controlling-means serving also to control said brake-cylinder-pressure control-valve.

2. In a fluid-pressure brake-system and in combination, a supply of air, a brake-cylinder connection to said supply, a brake-cylinder-pressure control-valve in said connection, a by-pass from the supply-side of said valve to the brake-cylinder side, and a valve-device controlling said by-pass; said valve device serving also to control said brake-cylinder-pressure control-valve.

3. In a fluid-pressure brake-system and in combination, a supply of air, a brake-cylinder connection to said supply, a brake-cylinder-pressure control-valve in said connection, a by-pass leading from the supply-side of said valve to the brake-cylinder side, and a pressure-actuated valve-device controlling said by-pass; said pressure-actuated valve-device serving also to control said brake-cylinder-pressure control-valve.

4. In a fluid-pressure brake-system and in combination, a supply of air, a brake-cylinder connection to said supply, a brake-cylinder-pressure control-valve in said connection, a by-pass leading from the supply-side of said valve to the brake-cylinder side, and a valve-device actuated by train-pipe pressure controlling said by-pass; said valve device serving also to control said brake-cylinder-pressure control-valve.

5. In a fluid-pressure brake-system and in combination, a supply of air, a brake-cylinder connection to said supply, a brake-cylinder-pressure control-valve in said connection, a by-pass leading from the supply-side of said valve to the brake-cylinder side, and a slide-valve controlling said by-pass; said slide valve serving also to control said brake-cylinder-pressure control-valve.

6. In a fluid-pressure brake-system and in combination, a supply of air, a brake-cylinder connection to said supply, a brake-cylinder-pressure control-valve in said connection, a by-pass leading from the supply-side of said valve to the brake-cylinder side, and a piston-operated slide-valve actuated by train-pipe pressure controlling said by-pass; said slide valve serving also to control said brake-cylinder-pressure control-valve.

7. In a combined straight air and automatic fluid-pressure brake-system and in combination, a supply of air, a direct brake-cylinder connection with said supply, a valve in said connection, pressure-actuated means controlling said valve, a by-pass from the supply-side of said valve to the brake-cylinder side, a train-pipe, a triple valve responsive to pressure changes in said train-pipe controlling said by-pass, and a source of pressure under the control of said triple valve to actuate said brake-cylinder-pressure control-valve.

8. In a combined straight air and automatic fluid-pressure brake system and in combination, a supply of air, a direct brake-cylinder connection with said supply, a control-valve in said connection, pressure-actuated means to operate said valve, a by-pass leading from the supply-side of said valve to the brake-cylinder side to balance said valve and its operating means, a train-pipe, a triple valve responsive to pressure changes in said train-pipe, and a source of pressure under the control of said triple valve to actuate said brake-cylinder-pressure control-valve.

9. In a combined straight air and automatic fluid-pressure-brake system and in combination, a supply of air, a direct brake-cylinder connection with said supply, a normally-closed control-valve in said connection, a pressure-operated piston for actuating said control-valve, a by-pass from the supply side of said control valve to the brake-cylinder side, a pressure-supply to the top of the control-valve piston, and a valve device controlling said by-pass and the pressure-supply to the control-valve.

10. In a fluid-pressure brake-system and in combination, a supply of air, a brake-cylinder connection with said supply, a normally-closed control-valve in said connection, a pressure-operated piston for actuating said control-valve, a by-pass from the supply-side of said control-valve to the brake-cylinder side, a pressure-supply to the top of the control-valve piston, and a valve-device controlling said by-pass and the control-valve piston supply and operating to initially open said by-pass.

11. In a fluid-pressure brake-system and in combination, a supply of air, a brake-cylinder connection with said supply, a normally-closed control-valve in said connection, a pressure-operated piston for actuating said control-valve, a by-pass from the supply-side of said control valve to the brake-cylinder side, a pressure-supply to the top of the control-valve piston, and a valve-device responsive to variations in train-pipe pressures controlling said by-pass and the control-valve piston supply and operating to initially open said by-pass.

12. In a fluid-pressure brake-system, a distributer for delivering straight air to a brake cylinder, comprising a control-valve, a piston for operating said valve, a piston slide-valve responsive to variations in train-pipe pressure for operating said control-valve piston, and means for retarding movement of said control valve-piston in "emergency" position of the distributer.

13. In a fluid-pressure brake-system, a distributer for delivering straight air to a brake-cylinder, comprising a control-valve, means for operating said control-valve, a valve-device responsive to variations in train-pipe pressure for operating said control-valve actuating means, means for releasing said actuating means after an application of brakes, and means for retarding the release of said piston after an "emergency" application.

14. In a fluid-pressure brake-system, a distributer for delivering straight air to a brake-cylinder, comprising a control-valve, a piston for actuating said control valve, a triple-valve responsive to variations in train-pipe pressure, to actuate and release said piston, and a restricted exhaust passage to retard the release of said piston when said triple-valve is in "emergency" position.

15. In a fluid-pressure brake-system, a distributer for delivering straight air to a brake-cylinder, comprising a control-valve, a piston for operating it, a triple-valve responsive to variations in train-line to actuate and release said piston, a continuous feed to said piston effective in "emergency" position of the triple, and a restricted release passage to retard release of said piston in "emergency" position of said triple.

16. In a fluid pressure brake system, a distributer for delivering air to a brake cylinder, comprising a control valve, a piston for actuating said control valve, a valve device responsive to variations in brake pipe pressure to control pressure on said piston, an expansion chamber and a restricted passage connecting said expansion chamber with the chamber of said piston.

17. In a fluid pressure brake system, a distributer for delivering air to a brake cylinder, comprising a control valve, a piston for actuating said control valve, an auxiliary pressure reservoir for said piston, a triple valve responsive to variations in brake pipe pressure to control auxiliary reservoir pressure to said piston, an expansion chamber, and a restricted passage to connect said expansion chamber with the chamber of said piston.

18. In a fluid pressure brake system, a distributer for delivering air to a brake cylinder, comprising a control valve, a piston for actuating said control valve, an expansion chamber connected with the chamber of said piston by a restricted passage, an auxiliary reservoir connected with the chamber of said piston and with said expansion chamber, and a triple valve responsive to variations in train pipe pressure controlling said piston chamber and expansion chamber passages.

In testimony whereof I affix my signature in presence of two witnesses.

JAMES A. HICKS.

Witnesses:
ARTHUR L. BRYANT,
A. V. CUSHMAN.